CONTINUOUS HORIZONTAL ROTARY FILTER OF THE TILTING CELL TYPE

Original Filed Oct. 26, 1950 9 Sheets-Sheet 1

INVENTOR.
ANDRE DELRUELLE
BY Pollard and Johnston

CONTINUOUS HORIZONTAL ROTARY FILTER OF THE TILTING CELL TYPE

Original Filed Oct. 26, 1950 9 Sheets-Sheet 2

INVENTOR.
ANDRE DELRUELLE
BY
Pollard and Johnston

CONTINUOUS HORIZONTAL ROTARY FILTER OF THE TILTING CELL TYPE

Original Filed Oct. 26, 1950 9 Sheets-Sheet 3

INVENTOR.
ANDRE DELRUELLE
BY Pollard and Johnston

CONTINUOUS HORIZONTAL ROTARY FILTER OF THE TILTING CELL TYPE

Original Filed Oct. 26, 1950 9 Sheets-Sheet 4

INVENTOR.
ANDRE DELRUELLE
BY Pollard and Johnston

CONTINUOUS HORIZONTAL ROTARY FILTER OF THE TILTING CELL TYPE

Original Filed Oct. 26, 1950 9 Sheets-Sheet 5

*INVENTOR.*
ANDRE DELRUELLE
*BY* Pollard and Johnston

CONTINUOUS HORIZONTAL ROTARY FILTER OF THE TILTING CELL TYPE

Original Filed Oct. 26, 1950 9 Sheets-Sheet 6

INVENTOR.
ANDRE DELRUELLE
BY Pollard and Johnston

CONTINUOUS HORIZONTAL ROTARY FILTER OF THE TILTING CELL TYPE

Original Filed Oct. 26, 1950 9 Sheets-Sheet 7

INVENTOR.
ANDRE DELRUELLE
BY Pollard and Johnston

CONTINUOUS HORIZONTAL ROTARY FILTER OF THE TILTING CELL TYPE

Original Filed Oct. 26, 1950 9 Sheets-Sheet 8

INVENTOR.
ANDRE DELRUELLE
BY Pollard and Johnston

May 15, 1956 A. DELRUELLE Re. 24,150

CONTINUOUS HORIZONTAL ROTARY FILTER OF THE TILTING CELL TYPE

Original Filed Oct. 26, 1950 9 Sheets-Sheet 9

INVENTOR.
ANDRE DELRUELL
BY Pollard and Johnston

United States Patent Office

Re. 24,150

Reissued May 15, 1956

24,150

CONTINUOUS HORIZONTAL ROTARY FILTER OF THE TILTING CELL TYPE

Andre Delruelle, deceased, late of Trooz, Belgium, by Martha Clementine Hubertine Van Leckwyck Delruelle, legal representative, Foret, Belgium, assignor, by mesne assignments, to Panmetals and Processes Inc., Panama, Panama, a corporation of Panama Original No. 2,684,158, dated July 20, 1954, Serial No. 192,249, October 26, 1950. Application for reissue July 18, 1955, Serial No. 532,814

Claims priority, application France October 26, 1949

17 Claims. (Cl. 210—202.5)

Matter enclosed in heavy brackets [ ] appears in the original patent but forms no part of this reissue specification; matter printed in italics indicates the additions made by reissue.

The present invention relates to new and useful improvements in continuous horizontal rotary filters of the tilting cell type.

Filters of that type possess advantages in that the filter cake can be covered evenly with the washing liquid and can be washed uniformly over its entire area, and in that the residual solution or filtrate present in the filter cake can be displaced efficiently by covering the cake with a minimum amount of the washing liquid.

In such continuous horizontal rotary filters provided with individual or separate filter cells, the filter cakes in the different cells can be successively subjected to washing liquids, as the cells are moved past selected stations, during rotation of the device. Since the washing liquid utilized in each cell is segregated from that used in the other cells and since each cell may be conveniently washed several times, this step in the filtration process can be efficiently performed. Filters of the described character operate in a continuous cycle; each of the cells receiving a charge of the liquid to be filtered at a selected point during rotation of the apparatus, then being subjected to the washing liquid at subsequent stations so as to remove the remaining filtrate from the solids and finally being inverted to remove the filter cake or solids from the cell before it is returned to an upright position to receive a new charge at the starting point. By reason of such continuous operation, filters of the described type have substantially great capacities while making possible accurate control of the filtered liquids.

A specific object of the present invention is to improve filters of the character indicated in such a manner that they can be constructed with substantially enlarged useful filtering surfaces to increase the yield of the filtration process without requiring any increase in the amounts of the solution being filtered, thus increasing the efficiency of the filter.

Another object is to provide filter cells of light construction so that the area of the filter surface may be substantially increased without effecting a resultant increase in the mass of the apparatus.

Another object is to provide a filter of the character described including a frame rotating about a central liquid distributing device and carrying filtering cells in a manner so that the latter can be tilted, wherein each of the cells is connected to the head of the distributing device by a flexible tube and a driving connection between the rotating frame and the head of the distributor is formed to permit displacement of the frame relative to the head so that the rigid tolerances required in the construction of the distributing device need not be applied to the remainder of the filter structure and the latter may be light in weight to thereby effect substantial economy in the use of expensive corrosion resistant materials when the liquids being filtered, for example acids, require the use of such special materials.

Another object is to provide filters of the character indicated with improved means for effecting and controlling the tilting movements of the filter cells so that filtration proceeds during the greater part of the rotational cycle of the cell and the latter is inverted at the end of the cycle for rapidly and completely discharging the filtered solid or filter cake from the cell to maintain the cell in a clean condition.

Another object is to provide a filtering apparatus of the character indicated wherein the filter cells are of light construction and have flat bottoms and wherein each cell is tilted to an inclined position, with the outlet thereof lowermost, at the end of the washing phase of the operating cycle and maintained in such inclined position for a specified period while a vacuum is applied thereto to effect complete withdrawal of the filtered acids from the cell prior to inverting the latter for disposal of the filter cake.

A further object of the invention is to provide a filtering apparatus of the character indicated wherein a vacuum is applied to each filter cell before the latter receives a new charge to thereby remove all washing water from the cell so that the acid of the new charge will not be diluted.

The foregoing and other objects, features and advantages of the invention will become apparent from the following detailed description of an illustrative embodiment thereof. While the described embodiment has been provided particularly for separation of gypsum and phosphoric acid during the industrial production of that acid by the wet process, the new features of combination, construction and operation which are claimed as the invention are not limited to this precise application, and filters constructed according to the invention may be advantageously employed in any large scale industrial filtration process, particularly where it is desired to provide several successive washing steps.

The detailed description refers to the accompanying drawings which form part hereof and in which.

Figure 1:
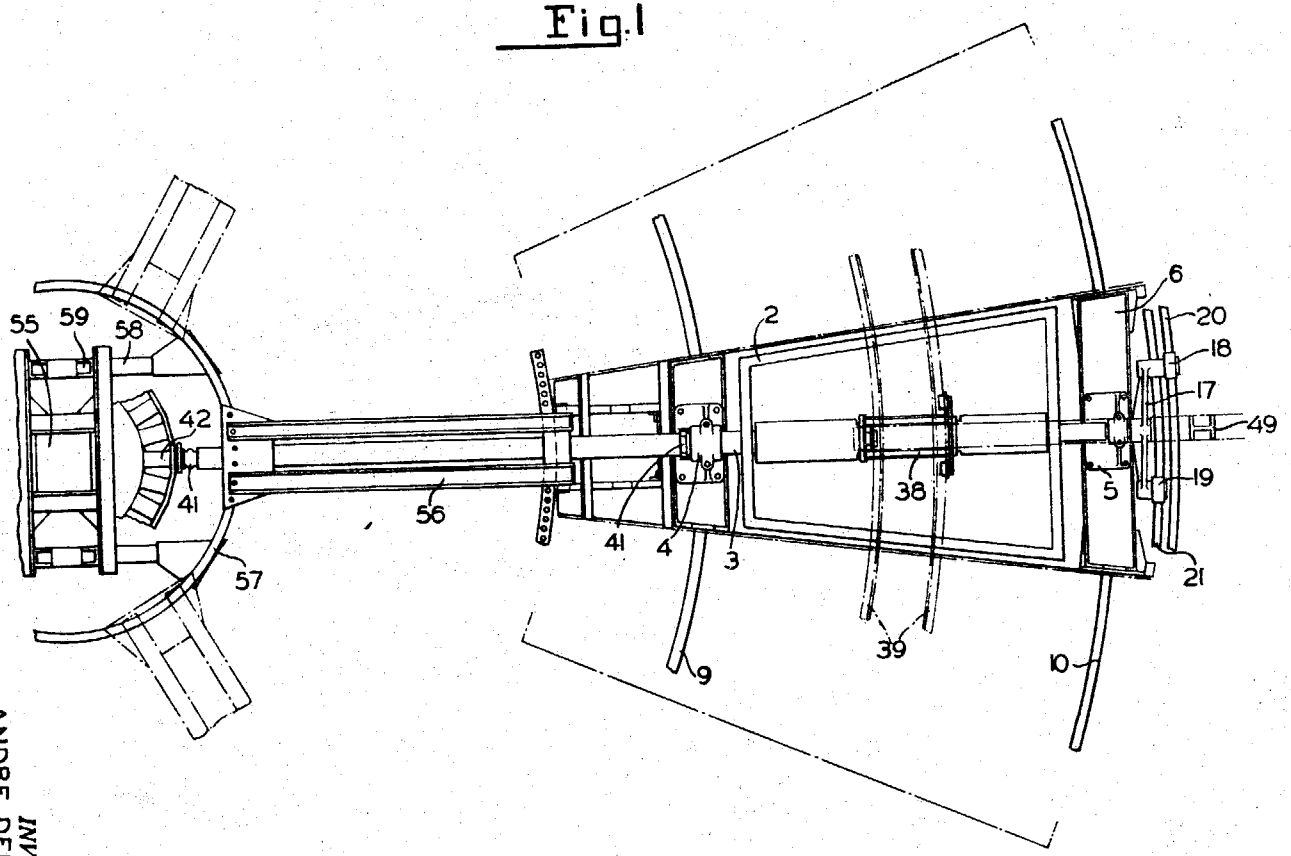
Fig. 1 is a partial top plan view of a rotary filter constructed according to an embodiment of the invention and showing the structure carrying one of the tilting filter cells.
Figure 2:
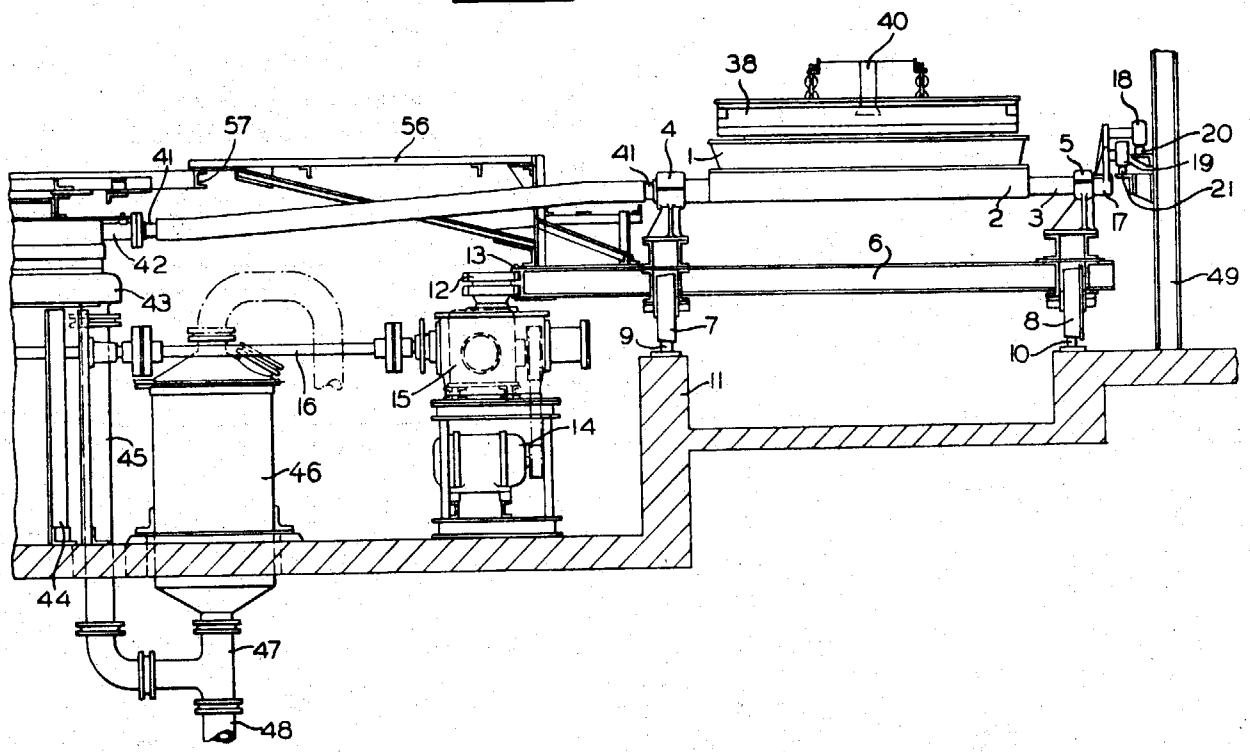
Fig. 2 is a side elevational view, partly in section, of the device of Fig. 1.
Figure 3:
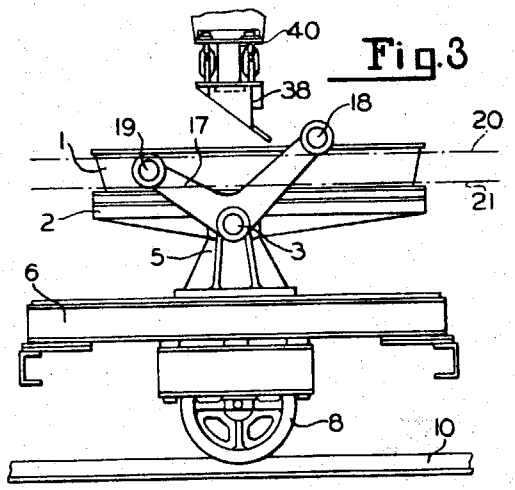
Fig. 3 is an outer end elevational view, on an enlarged scale, of the filter cell of Fig. 1.
Figure 4:
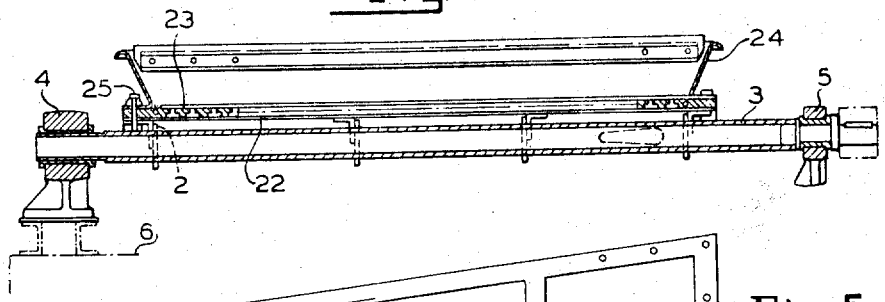
Fig. 4 is a longitudinal vertical section, on an enlarged scale, of the filter cell of Fig. 1.
Figure 5:
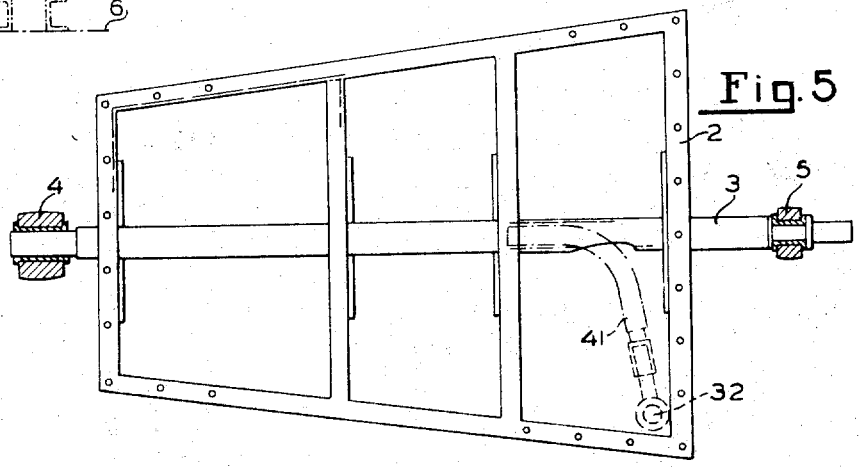
Fig. 5 is a top plan view of the supporting structure for the filter cell.
Figure 6:
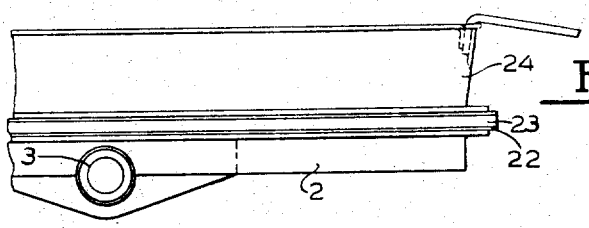
Fig. 6 is a fragmentary end elevational view, on an enlarged scale, of the filter cell of Fig. 4.
Figure 8:
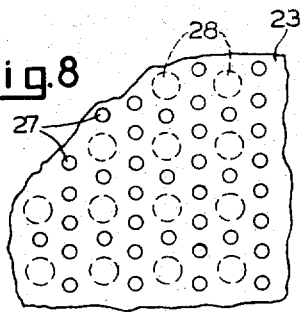
Fig. 8 is a fragmentary plan view of the bottom of the filter cell of Fig. 7, with the filter cloth removed.

Referring to the drawings in detail, and initially to Figs. 1–3 thereof, a filtering apparatus constructed according to an embodiment of this invention is there illustrated. The filtering apparatus includes a base or foundation 11, preferably formed of brick-work or masonry, supporting concentric, circular inner and outer tracks or guideways 9 and 10. An annular frame 6 is provided with inner wheels 7 riding on track 9 and outer flanged wheels 8 riding on outer track 10 so that frame 6 is rotatable in a horizontal plane above base 11.

A circularly arranged series of filter cells 1, each being in the form of an isosceles trapezoid, is mounted on the frame 6 in such a manner that the cells are capable of being individually tilted about radially extending axes. To permit such tilting of the cells 1, each of the latter is fixed on a supporting frame 2 which includes a radially extending shaft 3 journalled adjacent its opposite ends in bearings 4 and 5 carried by frame 6. Thus, the loads of the filter cells are taken up adjacent their inner and outer ends by the bearings 4 and 5 and distributed directly to the underlying tracks through frame 6 and wheels 7 and 8. By reason of the described supporting structure, bending stresses therein are kept at a minimum and, therefore, the weight of the various supporting elements may be reduced to economize on the amount of corrosion-resistant material employed.

Similar economies are further realized by effecting the driving of frame 6 at the periphery of the latter. For this purpose, a toothed rack 13 extends along the inner peripheral edge of frame 6 and is engaged by a pair of driving pinions or toothed wheels 12 (only one being shown in Fig. 2) which are located at diametrically opposed points. A motor 14 is mounted within the central well or pit formed by the base 11 and is suitably coupled to a transmission gearing arrangement 15 for reducing and varying the rotational speed of frame 6. One of the driving pinions 12 is coupled directly to the transmission gearing, while a shaft 16 extends from the gearing arrangement 15 diametrically across the well or pit to another gear box (not shown) for driving the other pinion.

In order to effect the controlled tilting of the several filter cells as frame 6 is rotated, a bell crank 17 having angularly related arms is secured to the outer end of each shaft 3 and carries rollers 18 and 19 at the free ends of the arms thereof. Standards 49 are fixed in the base 11 at spaced intervals outwardly of the path of travel of the outer periphery of frame 6 and support an outer cam track 20, upon which roller 18 rides, and an inner cam track 21, upon which roller 19 rides. The tracks 20 and 21 are provided with undulating forms, hereinafter specifically set forth, to control the position of each filter cell as the latter proceeds through a cycle of operation so that a cell of light weight construction may be used without decreasing the efficiency of the filtration process.

In the embodiment of the invention illustrated in Figs. 4–8, each cell 1 having the plan form of an isosceles trapezoid includes a flat, thin, bottom plate 22, an intermediate element or false bottom 23 overlying bottom plate 22 to support the filter cloth, and an inclined side wall or frame 24 of thin sheet metal extending around the margins of the bottom plate and false bottom. The lower edge of side wall 24 is bent outwardly and fastening elements, such as bolts, extend through this outwardly bent portion of the side wall, the false bottom and the bottom plate and into the frame 2 to secure these elements together. Bottom plate 22, side wall 24 and fastening elements 25 are preferably formed of a stainless steel, while false bottom 23 is formed of rubber or any other similar material so that all parts of the filter cell withstand or resist attack by acids, particularly phosphoric acid. Thus, the filter cell is light in weight, may be easily assembled or disassembled, and is suitable for the filtration of liquids of an acid nature.

Figure 7:
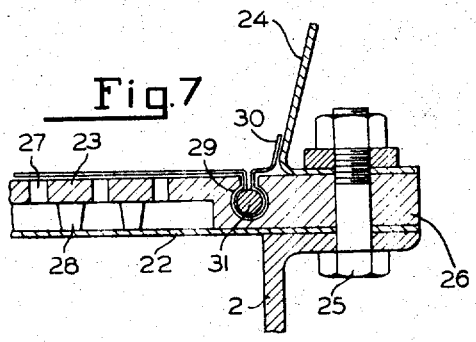
Fig. 7 is a fragmentary, longitudinal vertical section, on an enlarged scale, to show the details of construction of the filter cell of Fig. 4.

The false bottom 23 includes an imperforate marginal portion, to insure a liquid tight joint between side wall 24 and bottom plate 22, and a central portion which is provided with a flat upper surface and a recessed lower surface having projections or bosses 28 to engage the bottom plate. False bottom 23 is further formed with a multitude of small openings 27 extending from the flat upper surface and opening into the recess at the bottom surface between bosses 28 so that liquid may drain through openings 27 into the space between the central portion of false bottom 23 and plate 22 (Fig. 7). A filter cloth 30 covers the top surface of false bottom 23 and the latter is formed with undercut grooves 29 opening at its top surface along the marginal portions thereof to receive rods 31 for wedging the edge portions of the filter cloth therein. Thus, the filter cloth is maintained in a taut condition to cover false bottom 23 and the forces holding the cloth in position are distributed along the edges thereof rather than being localized, and yet the cloth may be easily replaced. Finally, an opening 32 is formed in bottom plate 22 to open into the recess in the bottom surface of false bottom 23 and to receive the liquid draining through the latter. In order to ensure the complete draining of this liquid from the place above bottom plate 22, opening 32 is positioned at a corner of the outer larger side of the isosceles trapezoid defining the plan form of plate 22 (Fig. 5) so that the opening will be lowermost when the filter cell is tilted about shaft 3.

Figure 9:
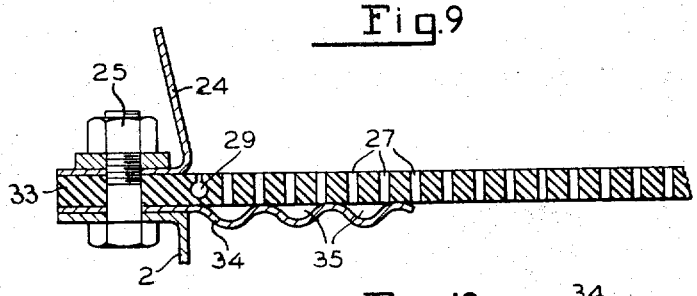
Fig. 9 is a vertical sectional view, similar to Fig. 7, but shows a filter cell constructed according to another embodiment of the invention.
Figure 10:
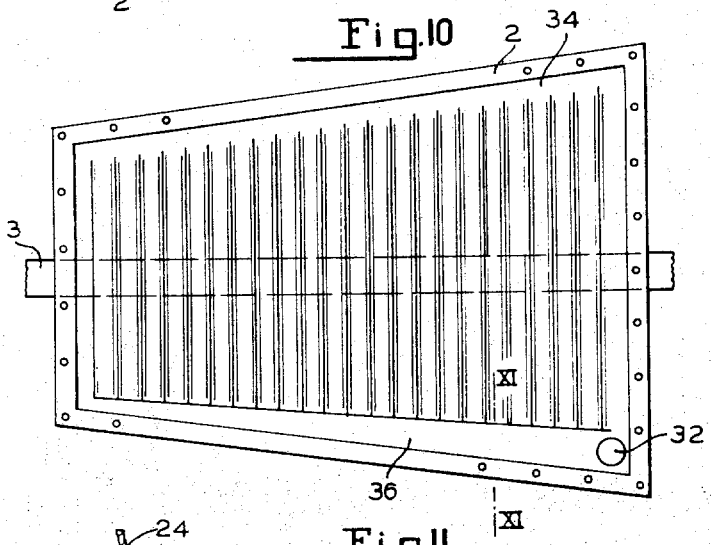
Fig. 10 is a top plan view of the bottom plate forming a part of the filter cell of Fig. 9.
Figure 11:
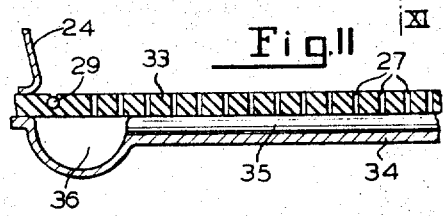
Fig. 11 is a fragmentary transverse vertical sectional view of the filter cell of Fig. 9, taken along the line XI—XI of Fig. 10.

In Figs. 9–11 a filter cell constructed according to another embodiment of the invention is illustrated and includes a bottom plate 34 formed with corrugations extending at right angles to the axis of rotation of shaft 3 and a false bottom 33, formed of rubber or other similar material, overlying the corrugated bottom plate to support the filter cloth. False bottom 33 is formed with openings 27 so that the liquid being filtered may pass therethrough into the channels 35 formed by the corrugations of plate 34. A groove or liquid collecting channel 36 is formed in bottom plate 34, and extends along a side edge of the latter to outlet opening 32 at one of the outer corners thereof.

Figure 12:
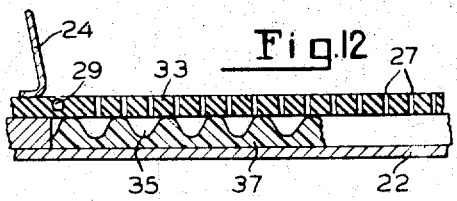
Fig. 12 is a longitudinal vertical sectional view, similar to Figs. 7 and 9, but showing a filter cell constructed according to still another embodiment of the invention.
Figure 14:
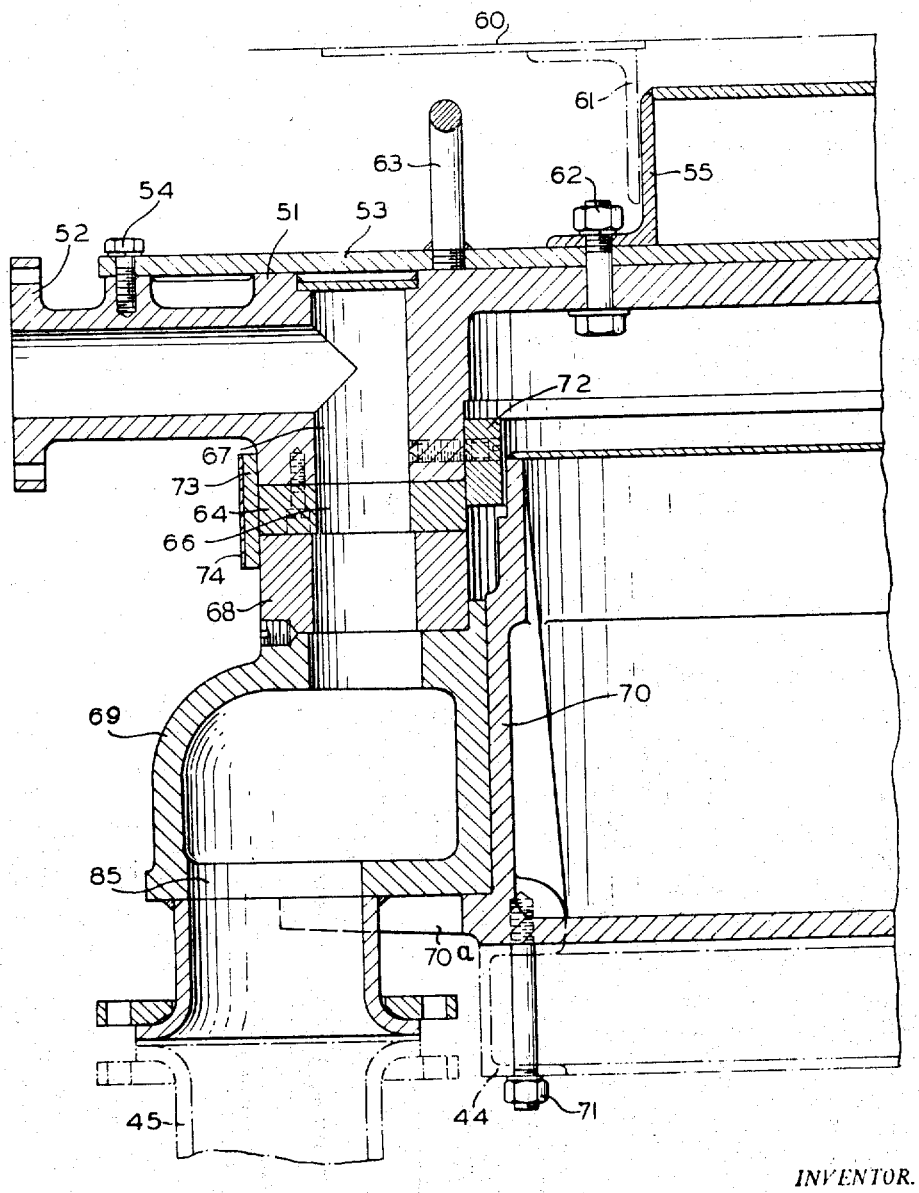
Fig. 14 is a vertical sectional view of one half of a centrally located distributing device.
Figure 15:
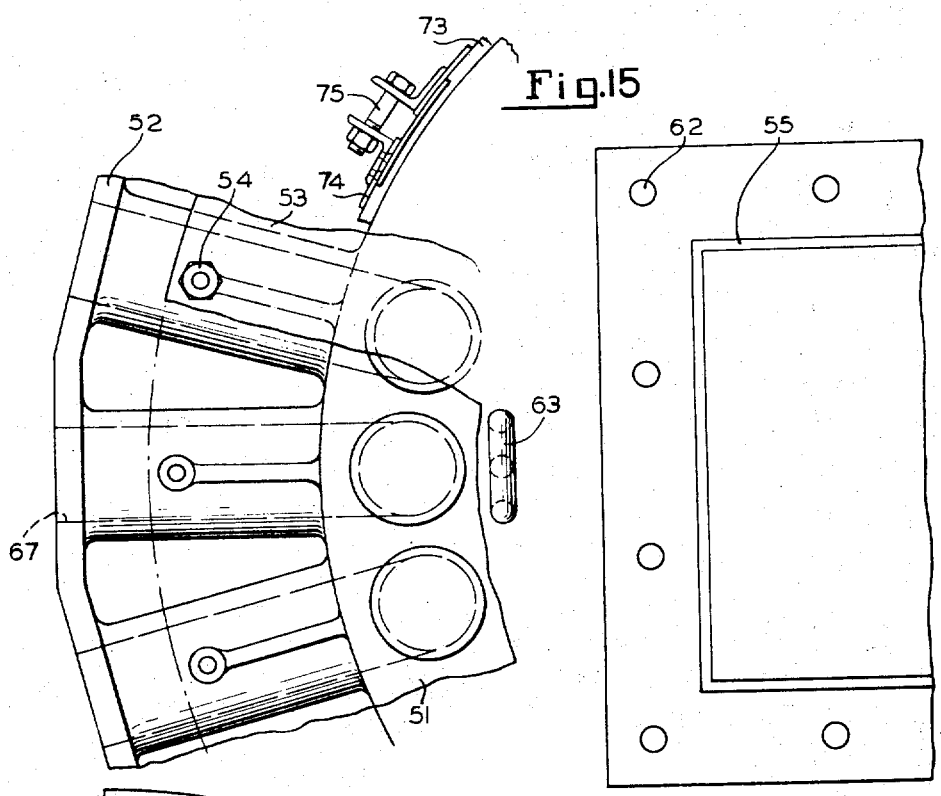
Fig. 15 is a fragmentary top plan view of a portion of the distributing device of Fig. 14.

Fig. 12 is a sectional view similar to Figs. 7 and 9 but taken through a filter cell constructed according to still another embodiment of the invention. The filter cell of Fig. 12 includes a flat, thin bottom plate 22 and a false bottom 33 formed of rubber or the like and having openings or perforations 27 therein. The false bottom 33 is spaced from bottom plate 22 by an element 37, preferably formed of molded phenol-formaldehyde resin, such as "Bakelite," or other similar plastic material, and having grooves 35 in the top surface thereof extending transversely or at right angles to the tilting axis of the cell and communicating at one end with a collecting groove or channel, similar to the channel 36 of Fig. 11, extending along one side edge of the cell for directing the drained liquids to the outlet formed in an outer corner of plate 22.

By reason of the bosses 28 of Fig. 7, the corrugations of the bottom plate 34 of Fig. 9, or the undulations of the element 37 of Fig. 12, it is possible to apply a very high vacuum to the space between the filter cloth and the bottom plate of the filter cell during certain periods of the continuous filtration process without collapsing or otherwise distorting the structure of the bottom of the filter cell, even though the construction of the latter is primarily of light weight acid resistant material. That is, the bottom plate and the filter cloth are held apart in each embodiment at points spaced over their entire areas so that the force of atmospheric pressure tending to collapse the bottom plate when a high vacuum is applied to the space between the bottom plate and filter cloth is resisted evenly at these many points rather than being concentrated.

The filter cells 1 are successively charged or filled as they pass under a charging tank 38 (Fig. 2) which is suspended from a track 39 disposed above the rotary filter so that the charging station may be disposed at any desired position. A pipe 40 opening into tank 38 supplies the material to be filtered, for example gypsum sludge or slurry discharged from a plant for manufacturing phosphoric acid.

After the liquid has been filtered through the filter cloth in each cell it is withdrawn from the cell through outlet opening 32 of the latter into a pipe 41 which is connected at its outer end to opening 32. According to the invention, pipe 41 is flexible, preferably of armored-rubber construction, and capable of withstanding twisting or torsional displacements of 180° between its ends. The inner end of each pipe 41 is fixed to a compartment or section of a rotatable head, generally indicated by the reference numeral 42 in Figs. 1 and 2, carried by a central distributing device 43 which is mounted fixedly on a supporting frame or pedestal 44. Since the pipes 41 are flexible and capable of twisting action, the opposite ends thereof may be securely attached to the bottom plates of filter cells 1 and to the respective sections of distributor head 42, and still permit tilting of the filter cells. Thus, no rotatable or movable sealing glands or joints are required at the ends of pipes 41 and a more complete seal may be effective to prevent the leakage of liquid or air past these joints. Furthermore, the flexibility of pipes 41 permits the true rotation of distributor head 42 unaffected by any irregularities in the rotational path of filter cells 1 or frame 6, and the rigid tolerances required in the manufacture of the parts of the distributor need not be extended or applied to the remainder of the filter structure.

The function of distributing device 43 is to place the several pipes 41 in communication with various vacuum separators and with the atmosphere at stages during the operating cycle of each filter cell 1 so that the filtering will proceed with optimum efficiency. The operating cycle of each filter cell may be considered to begin when the cell passes under tank 38 to receive a charge of, for example, gypsum sludge or slurry including phosphoric acid. As will be seen hereinafter, the cell is level, clean and dry when receiving the charge at the start of its operating cycle, and pipe 41 is in communication through the distributor with a vacuum separator to maintain a vacuum of 300 to 400 mm. of water column under the filter cloth for effecting the even distribution of the charge over the entire surface of the filter cloth. After charging of the cell is completed, the latter continues level or horizontal, and the pressure within the cell, that is under the filter cloth, is further decreased through the action of the distributor for the entire period during which the filtration of the mother liquid, in the illustrated case the phosphoric acid, and the various wash liquids takes place. The wash liquid is applied evenly to the successive cells by a weir distributor, also supported on the overhead trackway 39 for positioning at any desired location.

Before receiving a new charge, each cell must be drained of the liquid remaining therein, and the filter cake, in the illustrated case the gypsum, removed. Therefore, the tracks 20 and 21 are so formed that each cell is inclined approximately 45° near the end of the washing stage and continues so inclined for an extended period, with the opening 32 in the bottom thereof lowermost, so that the liquid completely drains through the outlet opening and no pools of liquid collect on the bottom plate of the filter cell by reason of irregularities in the surface of such bottom plate resulting from the thin material of which the latter is formed. This arrangement insures effective washing and complete recovery of the filtered acid.

After the filter cell has been tilted as above to provide for the complete draining of the liquids, rollers 18 and 19 of the filter cell engage portions of the respective cam tracks which are formed to further tilt the cell to an inverted or upside-down position and during this phase of the operating cycle the distributor places the interior of the cell in communication with the atmosphere so that the filter cake is free to drop out of the cell. Suitable jets may be positioned at the filter cake dumping station to spray water on the filter cake and thereby loosen it from the cell.

Further rotation of frame 6 brings the filter cell rollers 18 and 19 in contact with portions of the cam tracks effecting the return of the cell back to its original or horizontal position and the distributor then places pipe 41 in communication with a vacuum creating device to effect an air flow through the filter cloth for drying the latter and for removing any pools of water that may have collected on the bottom plate of the cell so that the acid in the subsequent charge received by the cell will not be diluted.

Figure 13:
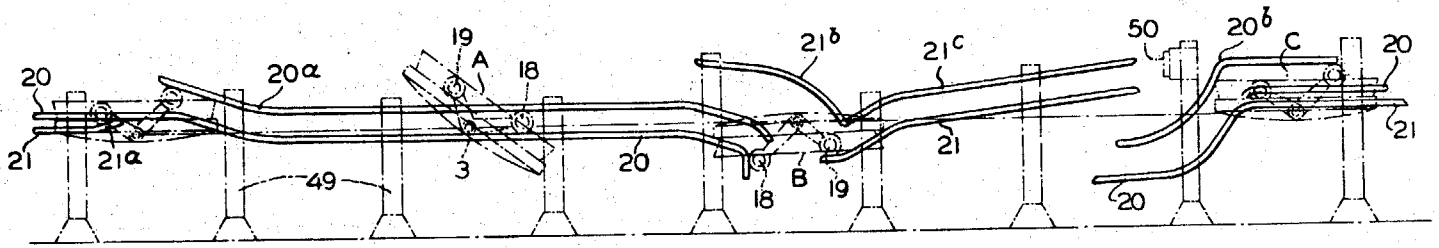
Fig. 13 is a diagrammatic illustration of the track structure provided for effecting the tilting of the several filter cells as the latter are rotated.

Referring now to Fig. 13, portions of the cam tracks are there shown diagrammatically to illustrate the action of such tracks in initially tilting, then inverting and finally righting the filter cells as the latter move through the above operating cycle. In the diagram, the filter cells travel from left to right with the shaft 3 moving along a horizontal path indicated by a broken line. Beginning at the left, the ends of horizontal stretches of cam tracks 20 and 21 are shown over which rollers 18 and 19, respectively, ride during the charging and washing phases of the operating cycle. Since the rollers 18 and 19 are disposed at opposite sides of the tilting axis of the cell and both rollers engage above the horizontal stretches of tracks 20 and 21, the cells are positively held against tilting in either direction during such charging and washing phases. As the cell approaches the end of the washing phase, cam track 21 terminates in an upwardly inclined section 21a while track 20 dips so that the cell is tilted approximately 45°. Track 20 after dipping, as noted above, continues horizontally at a lower level and roller 18 is held in contact with the depressed horizontal portion of track 20 by an overlying parallel cam track segment 20a. Thus, the cell will continue its movement in an inclined position (shown at A) so that the wash liquid may be completely drained therefrom as indicated above in the explanation of the operating cycle. Track 20 and overlying segment 20a terminate at the filter cake dumping station in downwardly inclined portions to further depress roller 18 and incline the cell until the center of gravity of the cell passes ahead of the tilting axis thereof and the cell thereby tips over to the inverted position B. Since this tipping over by reason of the displacement of the center of gravity may be prevented, for example by uneven distribution of the charge in the cell or by jamming or clogging of the bearings 4 and 5, a downwardly curving cam track segment 21b extends over the downwardly inclined portions of 20 and 20a to engage roller 19 and further urge the cell to the inverted position B. From the dumping station, cam track sections 21 and 21c incline upwardly to engage under and above roller 19 so that the cell is gradually tilted back to a vertical position. At the end of the upwardly inclining path defined by track section 21c and the underlying section of cam track 21 a bumper 50 is positioned to momentarily arrest the movement of roller 19 while the shaft 3 continues along its horizontal path of travel. Thus, the cell is further tilted back towards its upright or level position, and such righting of the cell is completed by the track section 20b and underlying section of cam track 20 which curve upwardly and engage above and below, respectively, roller 18. Cam track 20 then continues horizontally and the horizontal portion of track 21 starts again to engage under rollers 18 and 19, respectively, and maintain the cell in a level and upright condition C during the charging and washing phases of the repeated cycle of operation.

From the above description of the cooperative action of the various portions of cam tracks 20 and 21 and rollers 18 and 19, it is apparent that the successive tilting movements of the filter cells are at all times positively controlled in an automatic and positive manner as the frame 6 rotates, and further that this control is achieved without imposing excessive strains upon the arms of bell-crank 17 due to the light construction of the cell and the closeness of the center of gravity thereof to the tilting axis. It is also apparent that the angular relationship of the arms of bell-crank 17 positions at least one of the rollers 18 and 19 ahead of the tilting axis at all times so that vertical forces acting on such leading roller effect a substantial turning moment about the tilting axis.

Figure 16:
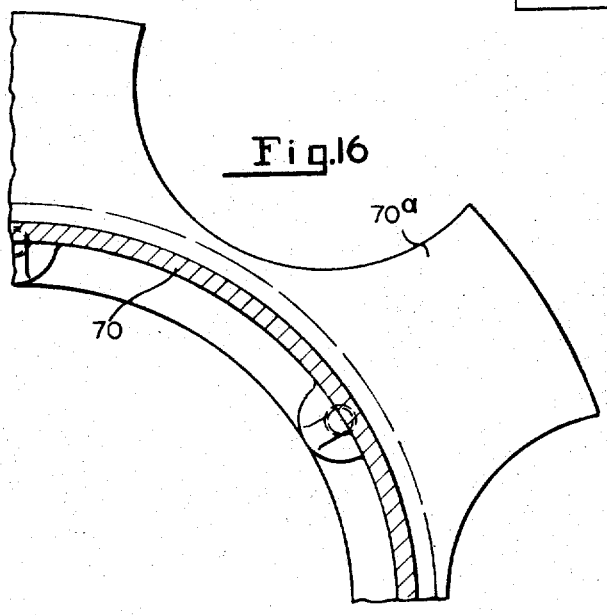
Fig. 16 is a fragmentary plan view of a portion of the fixed support for the distributing device.
Figure 17:
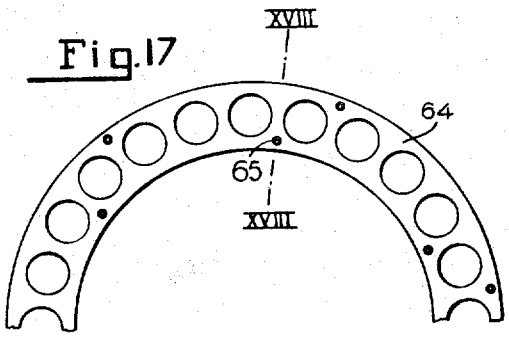
Fig. 17 is a plan view of a half of an element included in the distributing device.
Figure 18:
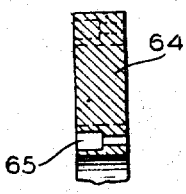
Fig. 18 is a vertical sectional view, on an enlarged scale, taken along the line XVIII—XVIII of Fig. 17.
Figure 19:
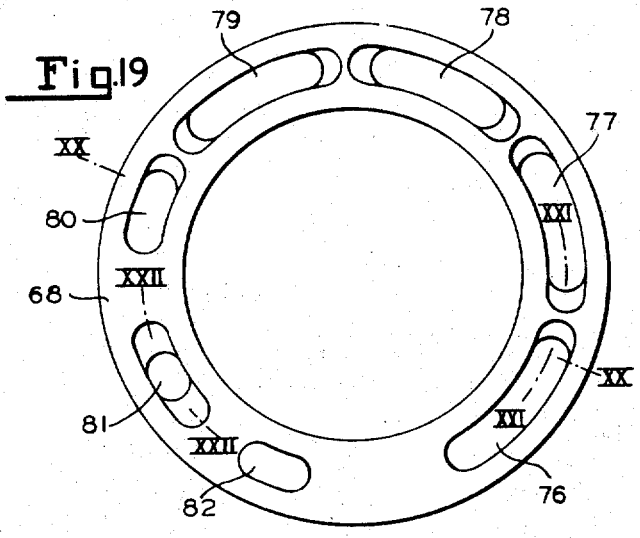
Fig. 19 is a plan view of another element included in the distributing device.
Figure 20:
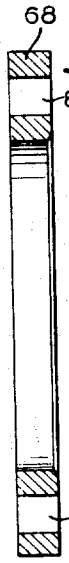
Fig. 20 is a vertical sectional view taken along the line XX—XX of Fig. 19.
Figure 21:
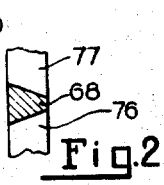
Fig. 21 is a fragmentary sectional view taken along the line XXI—XXI of Fig. 19.
Figure 22:
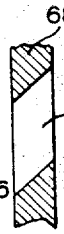
Fig. 22 is a fragmentary sectional view taken along the line XXII—XXII of Fig. 19.
Figure 23:
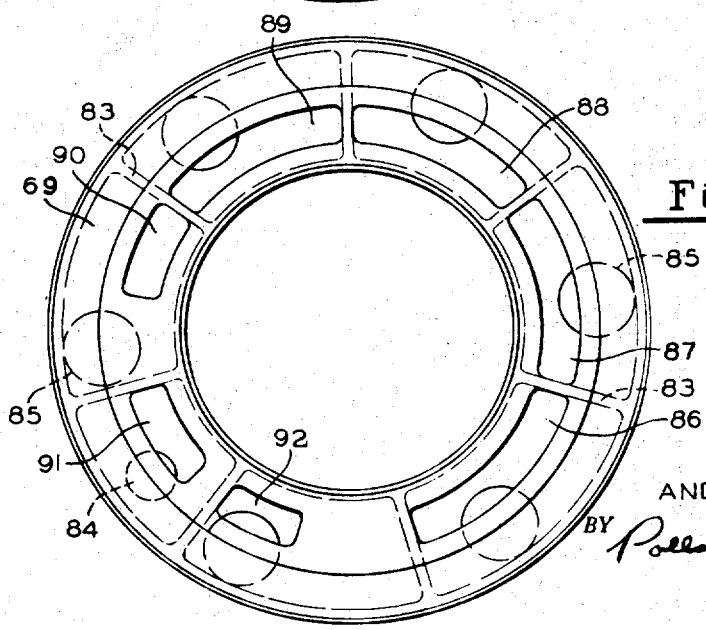
Fig. 23 is a plan view of still another element included in the distributing device.

In Figs. 14–23 the details of construction of distributing device 43 are illustrated. The distributing device includes a stationary central core 70 which is held by bolts 71 or otherwise fixed on top of supporting pedestal 44. Core 70 is formed with spaced radially extending projections 70a (Fig. 16). An annular casing 69 fits around core 70 and is formed with radial partitions 83 (Fig. 23) which divide the interior thereof into a plurality of chambers. In the illustrated embodiment, casing 69 is formed with openings 86, 87, 88, 89, 90, 91 and 92 in the top thereof, each opening into a separate chamber. Each chamber is also formed with an outlet opening in the bottom thereof and a pipe section extends therefrom (Fig. 14) to facilitate the attachment of conduits to the casing and also to engage between projections 70a of the central core and thus prevent rotation of casing 69.

The chamber having opening 91 in its top is suitably communicated with the atmosphere through the opening 84 in the bottom thereof, while a pipe 45 connects to the pipe section extending from the opening 85 of each of the other chambers and communicates the latter with a vacuum separator 46 (Fig. 2) through a T-coupling 47. A pipe 48 is connected to the remaining leg of the coupling and the liquid is separated from the gases and vaports while flowing through the latter, thereby forming a barometric column.

Rotatable head 42 of the distributing device includes a ring member 51 formed with a plurality of radially extending pipe sections 52 each having a flange on the outer end to provide for attaching flexible pipes 41 thereto. Ring member 51 is further formed with axially extending passages 67 into which radial pipe sections 52 open. A circular cover 53 is fixed to the top of ring member 51 by fastening screws 54 and closes the upper ends of passages 67.

A bushing ring 64 (Figs. 14 and 17) is secured to the bottom of ring member 51 by screws set in countersunk holes 65. Bushing ring 64 is formed with axially extending ports 66 communicating with the passages 67 of ring member 51 and bears on a distributing ring 68 fixed to the top of annular casing 69 so that the head is supported rotatably on the stationary parts of the distributing device. The rotatable head is centered with respect to stationary core 70 by a ring 72, formed of bronze, or other similar material, which is secured to the interior of ring member 51 and rides against the top portion of the side wall of core 70. A packing or sealing ring 73 extends around bushing ring 64 and covers the lines of separation between the bushing ring and ring member 51 and between the bushing ring and distributing ring 68. The packing or sealing ring is held in place by a split clamping band 74 tightened by screws 75 (Fig. 15) connecting its opposite ends.

In order to provide for rotation of head 42 synchronously with the rotation of frame 6 and the movement of the filter cells through their operating cycles a square boss or projection 55 is secured by the bolts 62 at the center of cover plate 53 and is engaged by a driving assembly carried by frame 6. The driving assembly includes radial arms 56 extending towards the center of rotation from frame 6 and carrying a circular ring 57 at their inner ends (Fig. 1).

Figure 25:
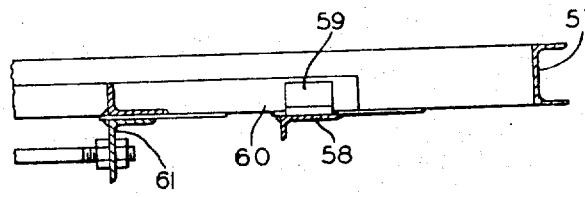
Fig. 25 is a vertical sectional view taken along the line XXV—XXV of Fig. 24.
Figure 24:
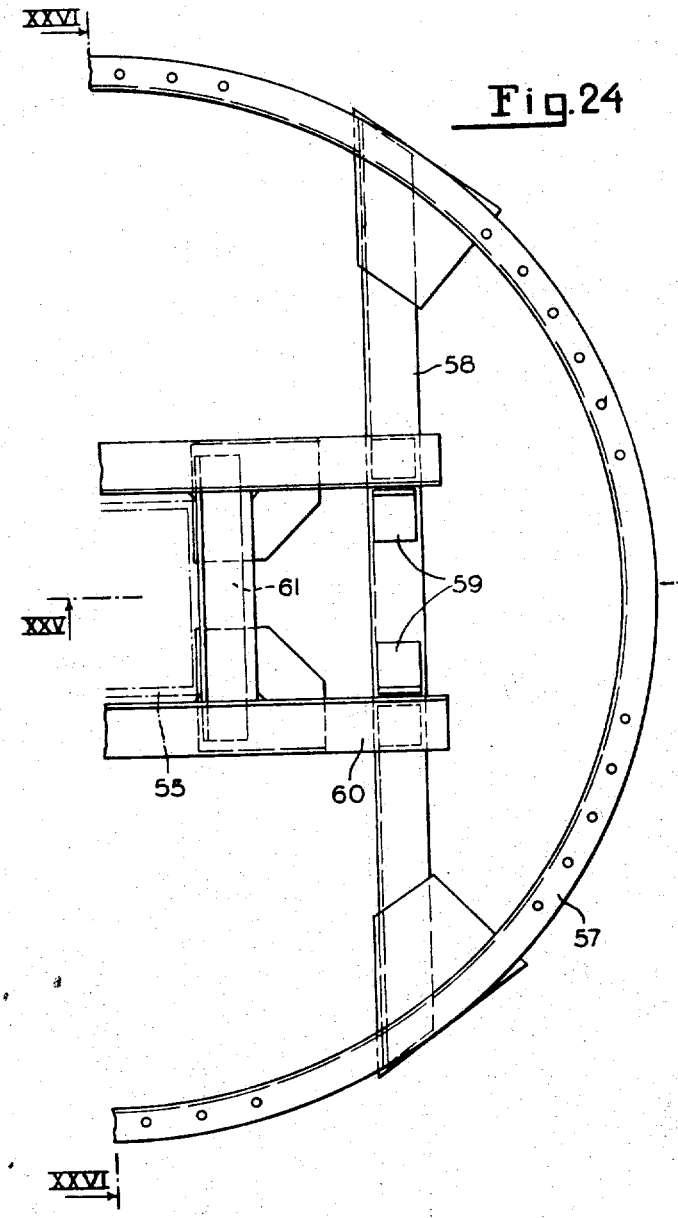
Fig. 24 is a plan view of a half of the structure provided for driving the distributing device.
Figure 26:
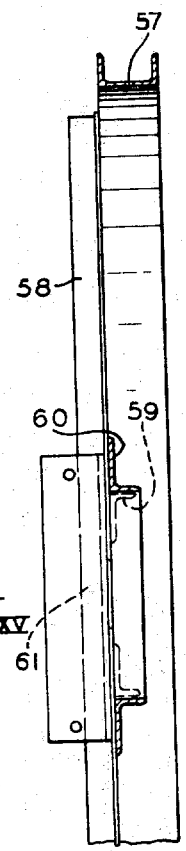
Fig. 26 is a fragmentary vertical sectional view taken along the line XXVI—XXVI of Fig. 24.

The circular ring 57 carries a structure, seen in detail in Figs. 24–26, for loose engagement over boss 55 to permit limited movement of the frame 6 independent of the distributing device. In the illustrated embodiment this structure includes a pair of rigid cross-beams 58 secured at their opposite ends to ring 57 and carrying spaced guide members 59, and a sliding frame 60 resting on cross-beams 58 and guided in movement at right angles to the latter by the guide members. Sliding frame 60 is provided with a pair of beams 61 extending parallel to cross-beams 58 and defining a rectangular opening having a large dimension in the direction of the cross-beams 58 and a smaller dimension, just large enough to receive the square boss 55 of the distributor head in the direction of the movement of sliding frame 60 relative to the cross-beams. Thus, boss 55 is free to move vertically and also horizontally, in the direction parallel to cross-beams 58, within the sliding frame, and the latter is free to move horizontally at right angles to beams 58.

Since the above construction provides a flexible connection between frame 6 and distributor head 42 and the only other connection therebetween is by flexible pipes 41, lateral stresses resulting from irregularities in the path of travel of frame 6 or filter cells 1 are not imposed upon the distributor head. It is also apparent that the driving connection between frame 6 and the distributor head imposes no vertical load on the latter so that the bushing ring 64 and distributor ring 68 of the distributor may be formed of a material which does not possess great mechanical strength, such as those including graphite or a synthetic resin and asbestos, for example, the material known by the trade name "Haveg," but has superior qualities in resisting attack by acids and in providing wear resistant sliding surfaces between the rings 64 and 68. The weight of the distributor head alone is sufficient to insure a tight seal between the sliding surfaces.

In the illustrated embodiment of the invention, distributor ring 68 is formed with seven ports or passages 76, 77, 78, 79, 80, 81 and 82 registering at their lower ends with the openings 86, 87, 88, 89, 90, 91 and 92, respectively, in the top wall of casing 69. The shape of the passages 76 to 82 at the upper surface of the distributor ring determines the duration of the successive phases of the filtration cycle during one rotation of the apparatus.

During the charging of a filter cell, the corresponding port of bushing ring 64 is aligned with the solid portion of the distributor ring between the passages 76 and 82. As the filter cell moves through an operating cycle, its port in the bushing ring registers successively with port 76, as the mother liquor is filtrated, port 77 for the first washing step, port 78 for the second washing step, port 79 for the third washing step with water, port 80 for the end phase of the washing step until the cell is inclined, port 81 for the step during which dumping of the filter cake is effected at which time the interior of the cell is in communication with the atmosphere through opening 84, and port 82 for the righting of the cell when a vacuum of 300 to 400 mm. of water column is applied to dry the filter cloth and remove any residual liquid in the cell.

It should be noted that an improved operating cycle results from the inclusion of ports 80 and 82 in the distributor ring, since these ports apply vacuum to the interior of the cell when the latter is tilted before being inverted to withdraw all of the acid therefrom and when the cell is being righted to prevent any water remaining therein from diluting the new charge. By reason of these improved phases of the operating cycle, flat bottomed filter cells may be efficiently employed.

It is also apparent that the filtering apparatus described above provides perfect centering of the rotatable head of the distributor, the use of appropriate materials to achieve good sliding contact between the distributor ring and the bushing ring of the distributor head and tight joints at the opposite ends of the flexible pipes extending from the distributor head to the several filter cells so that the possibility of loss of the filtered acid through leakage is materially reduced.

While preferred embodiments of the invention have been illustrated and described in detail, it will be apparent that the new features of construction and combination herein set forth may be embodied in other forms of filtering apparatus, and I therefore desire that the invention be accorded a scope fully commensurate with its contributions to the art, which are intended to be defined by the appended claims.

What is claimed is:

1. A filter cell for a continuous, horizontal, rotary filter of the tilting cell type comprising a substantially planar bottom having inwardly converging side edges and formed with an outlet opening in one of the outer corner portions thereof, a resilient false bottom overlying said bottom and being coextensive with the latter, upstanding walls extending along the marginal portions of said false bottom and formed with flanges on the lower edges to overlie said marginal portions, means extending through and securing together said flanges, said marginal portions and said bottom, means defining passages between said false bottom and said bottom in communication with said outlet opening, said false bottom having openings formed therethrough within the area of the false bottom defined by said upstanding walls, said openings communicating with said passages, a filter cloth extending over said false bottom, and means securing the edge portions of said filter cloth to said false bottom.

2. A filter cell according to claim 1, wherein the last mentioned means includes undercut grooves opening at the top surface of said false bottom and extending along said marginal portions of the latter, and elongated rods engaging above said edge portions of the filter cloth and wedging into said grooves so that the securing forces are distributed along the edges of said filter cloth.

3. A filter cell according to claim 1, wherein said bottom is flat and said means defining passages includes a recess formed in the under side of said false bottom and opening into said outlet opening and spaced projections in said recess for engagement with said bottom.

4. A filter cell according to claim 1, wherein said means defining passages includes transversely extending corrugations formed in the area of said bottom underlying said openings of said false bottom and a channel extending along one side edge of said bottom to open at one end into said outlet opening and at the side thereof into the adjacent ends of said corrugations.

5. A filter cell according to claim 1, wherein said bottom is flat and said means defining passages includes a rigid spacing member interposed between said bottom and said false bottom, said spacing member being formed with transversely extending grooves in the top surface thereof communicating with said openings in the false bottom and with a channel along one side edge opening at one end into said outlet opening and at the side into the adjacent ends of said transversely extending grooves.

6. In a continuous, horizontal rotary filter including an annular frame rotatable about a central vertical axis, a circularly arranged series of filter cells carried by said annular frame for tilting about radially extending horizontal axes and for successive movement through charging, filtering, washing and filter cake discharging stations, the combination of a centrally located fluid distributing device including a fixed body, an annular upwardly facing distributor ring carried by said body and formed with circumferentially spaced ports for communication with vacuum separator devices and the atmosphere, a head rotatable on said body about an axis substantially coinciding with said vertical axis and formed with passages opening radially and downwardly at their opposite ends, an annular bushing ring on said head bearing downwardly on said distributor ring and formed with circumferentially spaced openings communicating with said passages and successively registering with said ports as the head is rotated, flexible conduits extending between the filter cells and the radially opening ends of said passages, and means carried by the frame and vertically as well as radially displaceable relative to said head for driving the latter so that the frame exerts no radial or vertical forces on the head and said bushing ring and distributor ring may be formed of a material effecting a liquid tight seal at their meeting surfaces but having a relatively low strength under compression.

7. A continuous rotary filter of the tilting cell type comprising an annular frame, a series of filter cells carried by said frame, a fluid distributing device arranged centrally of the annular frame and having a head rotatable about a central vertical axis, flexible conduits connecting the filter cells to the fluid distributing device, drive mechanism operative upon the annular frame to rotate it about an axis substantially coinciding with said vertical axis, the filter cells being tiltable relative to the annular frame about substantially horizontal axes radially disposed with respect to the axis of rotation of the frame, coupling means between the annular frame and the rotatable head of the distributing device, said coupling means comprising a driven member fixed to said head and a cooperating driving member carried by the annular frame, said driven and driving members being vertically and radially movable relative to one another, and cam trackways arranged circumferentially with respect to the annular frame for engagement with cam elements operative upon the filter cells to tilt the cells.

8. A continuous rotary filter of the tilting cell type comprising an annular frame, a series of filter cells carried by said frame, a fluid distributing device arranged centrally of the annular frame and having a head rotatable about a central vertical axis, flexible conduits connecting the filter cells to the fluid distributing device, drive mechanism operative upon the annular frame to rotate it about an axis substantially coinciding with said vertical axis, the filter cells being tiltable relative to the annular frame about substantially horizontal axes radially disposed with respect to the axis of rotation of the frame, coupling means between the annular frame and the rotatable head of the distributing device, said coupling means comprising a driven member fixed to said head and a driving assembly carried by the annular frame, said driving assembly including a support fixed to the annular frame, and a sliding frame carried by the support and movable linearly and horizontally relative to the latter, said sliding frame engaging said driven member and being movable both vertically and horizontally at right angles to the direction of movement of said sliding frame relative to said support, and cam trackways arranged circumferentially with respect to the annular frame for engagement with cam elements operative upon the filter cells to tilt the cells.

9. A continuous rotary filter of the tilting cell type comprising horizontal circular supporting tracks, an annular frame mounted on said tracks, a series of filter cells carried by said frame, a fluid distributing device arranged centrally of the annular frame and having a head rotatable about a central vertical axis, flexible conduits connecting the filter cells to the fluid distributing device, drive mechanism operative upon the annular frame to rotate it about an axis substantially coinciding with said vertical axis, the filter cells being tiltable relative to the annular frame about substantially horizontal axes radially disposed with respect to the axis of rotation of the frame, coupling means between the annular frame and the rotatable head of the distributing device, said coupling means comprising a flatsided projection centrally located on the top of said head and a driving assembly carried by the annular frame, said driving assembly including a support fixed to the annular frame, and a sliding frame freely carried by said support and formed with an elongated straight-sided opening receiving said flat-sided projection and movable vertically as well as radially parallel to the flat sides of said projection relative to the latter, and guide means on said support engaging said sliding frame to restrict radial movement of the latter relative to said support to the direction at right angles to the direction of the radial movement of said sliding frame relative to said projection, cam trackways arranged circumferentially with respect to the annular frame for engagement with cam elements operative upon the filter cells to tilt the cells.

10. A continuous, horizontal, rotary filter of the tilting cell type comprising an annular frame rotatable about a central vertical axis, a circularly arranged series of upwardly opening filter cells carried by said frame and tiltable about radially extending horizontal axes, each of said cells having a horizontal bottom and lateral sides converging toward the center of rotation of said frame and an outlet opening for draining fluid from the cell formed in one of the outer corner portions of said bottom, cam elements carried by each of said cells, and cam trackways arranged circumferentially with respect to the annular frame for engagement with said cam elements to hold said cells inclined downwardly toward their respective fluid outlet openings in part of their path of rotation about said axis and then further to tilt the cells.

11. A continuous, horizontal, rotary filter of the tilting cell type comprising an annular frame rotatable about a central vertical axis, a circularly arranged series of upwardly opening filter cells carried by said frame and tiltable about radially extending horizontal axes, each of said cells having a horizontal bottom and lateral sides converging toward the center of rotation of said frame and an outlet opening for draining fluid from the cell formed in one of the outer corner portions of said bottom, and a filter cloth extending over and spaced from said bottom, and a fluid distributing device arranged centrally of the annular frame and connected to said outlet openings.

12. A continuous, horizontal, rotary filter of the tilting cell type comprising an annular frame rotatable about a central vertical axis; a circularly arranged series of filter cells carried by said frame and tiltable about radially extending horizontal axes, and means controlling the position of each of said cells as said frame rotates including two obtusely related cam arms fixed to each filter cell and extending forwardly and rearwardly, respectively, of the tilting axis of the related filter cell when the latter is upright so that at least one of said cam arms is at all times inclined relative to the vertical plane passing through said tilting axis, and two cam trackways each engageable by one of said two cam arms, said trackways being arranged circumferentially with respect to the annular frame and at different radial distances from said vertical axis and having horizontal portions and overlapping inclined portions, the horizontal portions being located at different levels, by reason of all of which the cells are maintained in level upright position during part of their cycle of travel about said vertical axis, in inclined position during another part of the cycle, and inverted at another point of the cycle, and are restored to their level upright position to repeat the cycle.

13. A continuous, horizontal, rotary filter of the tilting cell type comprising an annular frame rotatable about a central vertical axis; a circularly arranged series of filter cells carried by said frame and tiltable about radially extending horizontal axes and for successive movement through charging, filtering, washing and filter-cake discharging stations during each revolution of said frame; and means positively controlling the position of each of said cells as said frame rotates including first and second cam arms fixed to each filter cell and extending forwardly and rearwardly, respectively, as well as above the tilting axis of the related filter cell when the latter is upright so that at least one of said cam arms at all times extends ahead of said tilting axis, and first and second cam trackways engageable with said first and second cam arms, respectively, said first and second trackways being formed with horizontal portions extending opposite said charging and filtering stations and a substantial initial portion of said washing station and engaging below the respective cam arms to maintain said related filter cell in upright position, said first trackway being offset downwardly at a point opposite the end portion of said washing station to depress said first cam arm thereby inclining said related filter cell in the direction of its movement, said first trackway also inclining downwardly at a point adjacent said filter cake discharging station to further depress said first cam arm to a vertical position while said second trackway engages said second cam arm from above and inclines downwardly to depress the engaged second cam arm and invert the cell, said second trackway inclining upwardly from a point just beyond said filter cake discharging station to return said second arm to a vertical position while said first trackway engages said first cam arm when said second arm is vertical and inclines upwardly to raise said first arm and restore said related cell to upright position at a point in advance of said charging station.

14. A continuous, horizontal, rotary filter of the tilting cell type comprising an annular frame rotatable about a central vertical axis, a circularly arranged series of upwardly opening filter cells carried by said frame and tiltable about radially extending horizontal axes, each of said cells having a horizontal bottom and lateral sides converging toward the center of rotation of said frame and an outlet opening for draining fluid from the cell formed in one of the outer corner portions of said bottom, a resilient false bottom overlying said bottom, said false bottom being formed with a multiplicity of filtration openings extending therethrough, means defining free fluid passages between said bottom and said false bottom and in communication with said outlet opening, and a filter cloth extending over the top surface of said false bottom.

*15. A continuous rotary filter of the tilting cell type comprising a massive annular frame, a series of filter cells carried by said frame, a fluid distributing device mounted independently and centrally of the annular frame*

*and having a head rotatable about a central vertical axis, drive mechanism operative upon the annular frame to rotate it about an axis substantially coinciding with said vertical axis, the filter cells being radially disposed with respect to the axis of rotation of the frame and being tiltable relative to the annular frame about substantially horizontal axes, means operative upon the filter cells to tilt the cells, and means for driving the rotatable head of the distributing device synchronously with the rotation of the annular frame, an annular trackway supporting said frame, and flexible fluid conduits respectively connecting said filter cells with said head, said driving means holding said head against angular displacement relative to said frame in the direction of said rotation but keeping said frame freely displaceable radially and vertically relative to said head as it is rotated about said trackway.*

*16. A continuous rotary filter of the tilting cell type comprising a massive annular frame, a series of filter cells carried by said frame, a fluid distributing device mounted independently and centrally of the annular frame and having a head rotatable about a central vertical axis, drive mechanism operative upon the annular frame to rotate it about an axis substantially coinciding with said vertical axis, the filter cells being tiltable relative to the annular frame about substantially horizontal axes radially disposed with respect to the axis of rotation of the frame, means operative upon the filter cells to tilt the cells, an annular trackway supporting said frame, and flexible fluid conduits respectively connecting said filter cells with said head, said flexible conduits being axially aligned with the tilting axes of the cells at the points where said flexible conduits reach the inner ends of the cells, by virtue of all of which the cells are tiltable*

*without the provision of movable sealing glands and the annular frame is freely displaceable radially and vertically relative to said head as it is rotated about said trackway.*

*17. A continuous rotary filter of the tilting cell type comprising a massive annular frame, an annular trackway supporting said frame, a series of filter cells carried by said frame, a fluid distributing device mounted independently and centrally of the annular frame and having a head rotatable about a central vertical axis, drive mechanism operative upon the annular frame to rotate it about an axis substantially coinciding with said vertical axis, a series of hollow shafts mounted radially on said frame, each of said cells being supported on one of said shafts and being tiltable relative to said frame by rotation of the supporting shaft, and flexible fluid conduits respectively connecting said filter cells with said head, said flexible conduits extending through said hollow shafts.*

References Cited in the file of this patent or the original patent

UNITED STATES PATENTS

| | | |
|---|---|---|
| 830,388 | Weekley | Sept. 4, 1906 |
| 877,000 | Ridgway | Jan. 21, 1908 |
| 938,378 | Grothe et al. | Oct. 26, 1909 |
| 938,636 | Browne | Nov. 2, 1909 |
| 945,193 | Ridgway | Jan. 4, 1910 |
| 978,381 | Kier | Dec. 13, 1910 |
| 1,028,789 | Rothwell | June 4, 1912 |
| 1,335,695 | Oliver | Mar. 30, 1920 |
| 1,882,045 | Stevens | Oct. 11, 1932 |
| 2,188,840 | McCue | Jan. 30, 1940 |